United States Patent [19]

Bachand

[11] 4,157,202

[45] Jun. 5, 1979

[54] TRUCK COVER

[75] Inventor: Ernest C. Bachand, Auburn, Mass.

[73] Assignee: Pioneer Cover-All, Inc., North Oxford, Mass.

[21] Appl. No.: 857,563

[22] Filed: Dec. 5, 1977

[51] Int. Cl.² ............................................... B60J 7/06
[52] U.S. Cl. ................................................... 296/100
[58] Field of Search ................... 296/100, 98; 160/344

[56] References Cited

U.S. PATENT DOCUMENTS

| | | | |
|---|---|---|---|
| 3,656,802 | 4/1972 | White | 296/100 |
| 4,082,347 | 4/1978 | Petretti | 296/100 |

*Primary Examiner*—Robert R. Song
*Attorney, Agent, or Firm*—Weingarten, Maxham & Schurgin

[57] ABSTRACT

A truck cover for use with an open top truck body and which can be furled in an open position at the forward end of the body and unfurled into a position covering the open body top. A cover sheet of flexible material is secured at its forward edge to a motor driven assembly disposed at the forward end of a truck body and having a rotatable shaft. The rearward edge of the cover sheet is secured to a spring-loaded frame which normally urges the cover into a rearward position covering the open body top. A plurality of cables are disposed along spaced parallel paths extending the full length of the cover sheet and are slidably attached to the cover sheet by a plurality of rings. The cables are secured at one end at the spring-loaded frame and at the other end to the rotatable shaft. Upon rotation of the shaft in a first direction, the cables are wound onto the shaft, causing the cover sheet to be drawn forward into a furled position. Upon rotation of the shaft in an opposite direction, the cables are unwound from the shaft and the cover sheet unfurled into its position covering the open body top.

6 Claims, 5 Drawing Figures

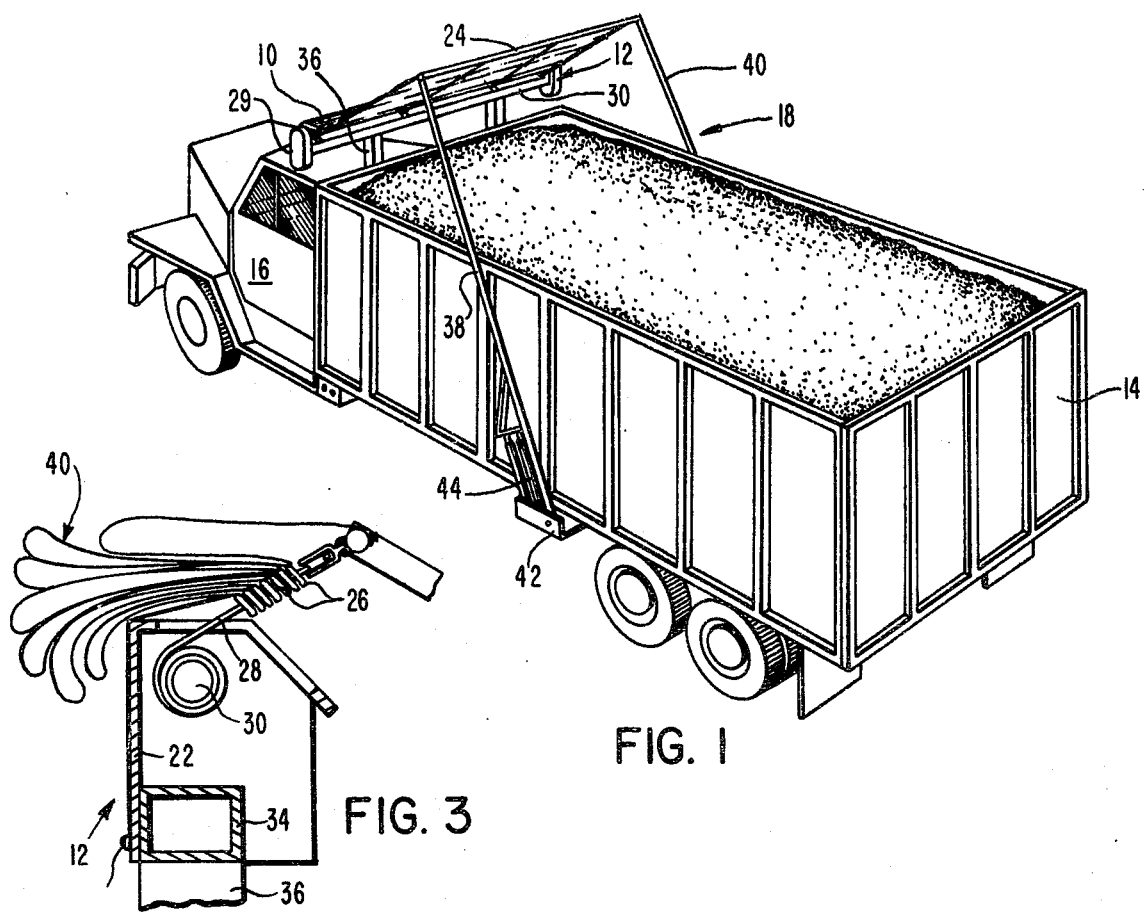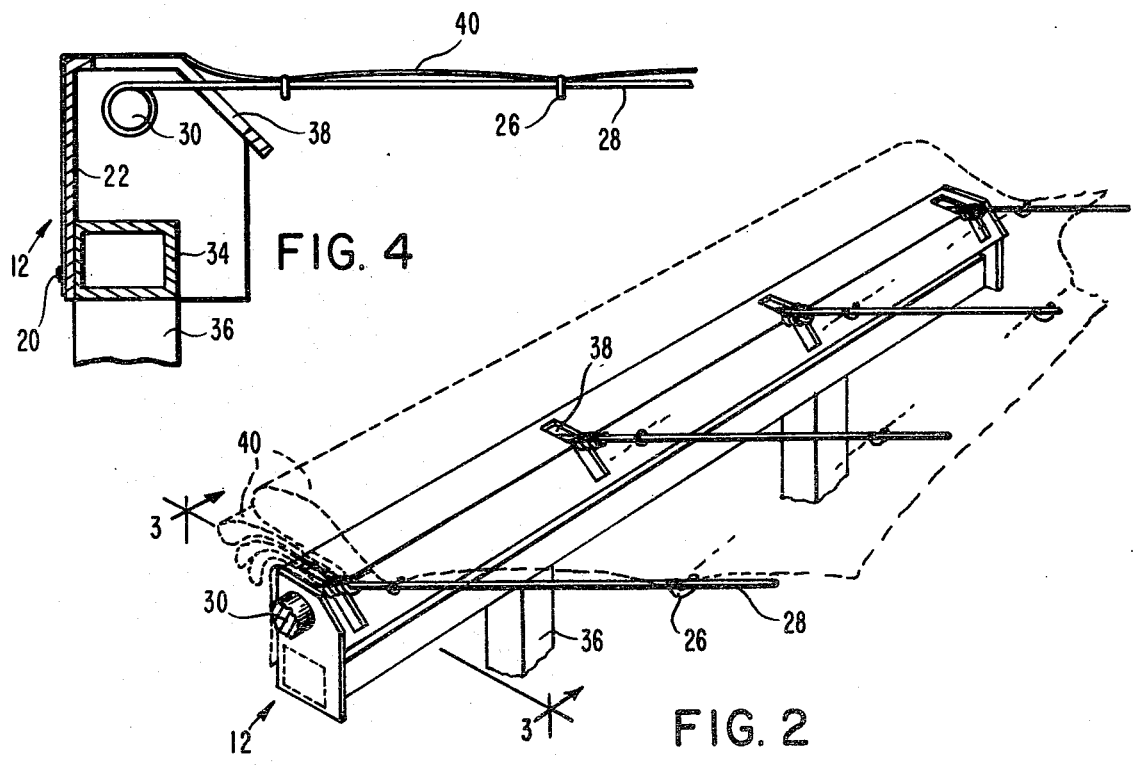

TRUCK COVER

FIELD OF THE INVENTION

This invention relates to truck covers and more particularly to an improved cover for an open box-type truck body.

BACKGROUND OF THE INVENTION

In trucks having open box-type bodies, such as dump trucks for carrying particulate or discrete materials which can fall out of or be blown from the open body, truck covers are often employed to enclose the open body top to prevent such spillage and litter of the truck contents onto the highway and adjoining land. Government regulations often mandate the covering of open truck bodies for control of litter. Truck covers are generally known, as shown for example in U.S. Pat. Nos. 3,515,428, 3,549,197 and 3,549,199, in which a cover is retractably installed on a truck body and movable into open and closed positions. In the truck covers of the type shown in the above-noted patents, a cover sheet is rolled onto a shaft rotatable by a hand crank. The rearward edge of the cover is attached to a spring-loaded frame and upon unwinding of the shaft the frame draws the cover over the open truck top. The cover is composed of a canvas or other flexible sheet material and is supported only at the forward and rearward edges with the result that the cover can flap, especially in a strong wind, and can billow upward with the possibility of uncovering the truck top and permitting spillage of the truck contents.

SUMMARY OF THE INVENTION

In brief, the present invention provides a truck cover of improved construction and operation and which remains under controlled tension during furling and unfurling and which is secured along its entire length in both the furled and unfurled position. The invention comprises a cover sheet of canvas or other suitable flexible sheet material of a size and configuration to cover the open top of a truck body with which it is associated, the cover sheet being slidably attached to a plurality of cables extending along spaced parallel paths along the length of the cover sheet. An assembly is disposed at the forward end of the truck body and to which the forward edge of the cover sheet is attached. This usually includes furling means such as a motor driven rotatable shaft to which the forward ends of the cables are attached. The rearward ends of the cables and cover sheet are attached to a spring loaded frame pivotally attached to the truck and operative to urge the cover sheet to a rearward position covering the open body top. The cover sheet is slidably attached to the cables by a plurality of rings or grommets extending from the underside of the sheet.

In order to open the cover to expose the open body top, the motor driven shaft is operated in a first direction to coil the cables onto the shaft and draw the cover sheet into a furled position at the forward end of the truck body against the urging of the spring-loaded frame. To move the cover into its closed position over the body top, the motor driven shaft is caused to rotate in its opposite direction to uncoil the cables wound therearound and permit the unfurling of the cover sheet under the spring action of the frame.

DESCRIPTION OF THE DRAWINGS

The invention will be more fully understood from the following detailed description taken in conjunction with the accompanying drawings in which:

FIG. 1 is a pictorial view of the novel truck cover installed on a truck body;

FIG. 2 is a cutaway pictorial view of the furling and unfurling assembly of the invention;

FIG. 3 is a sectional elevation view of the novel truck cover in its furled position;

FIG. 4 is a sectional elevation view of the novel truck cover in its unfurled position.

DETAILED DESCRIPTION OF THE INVENTION

Figure 5:
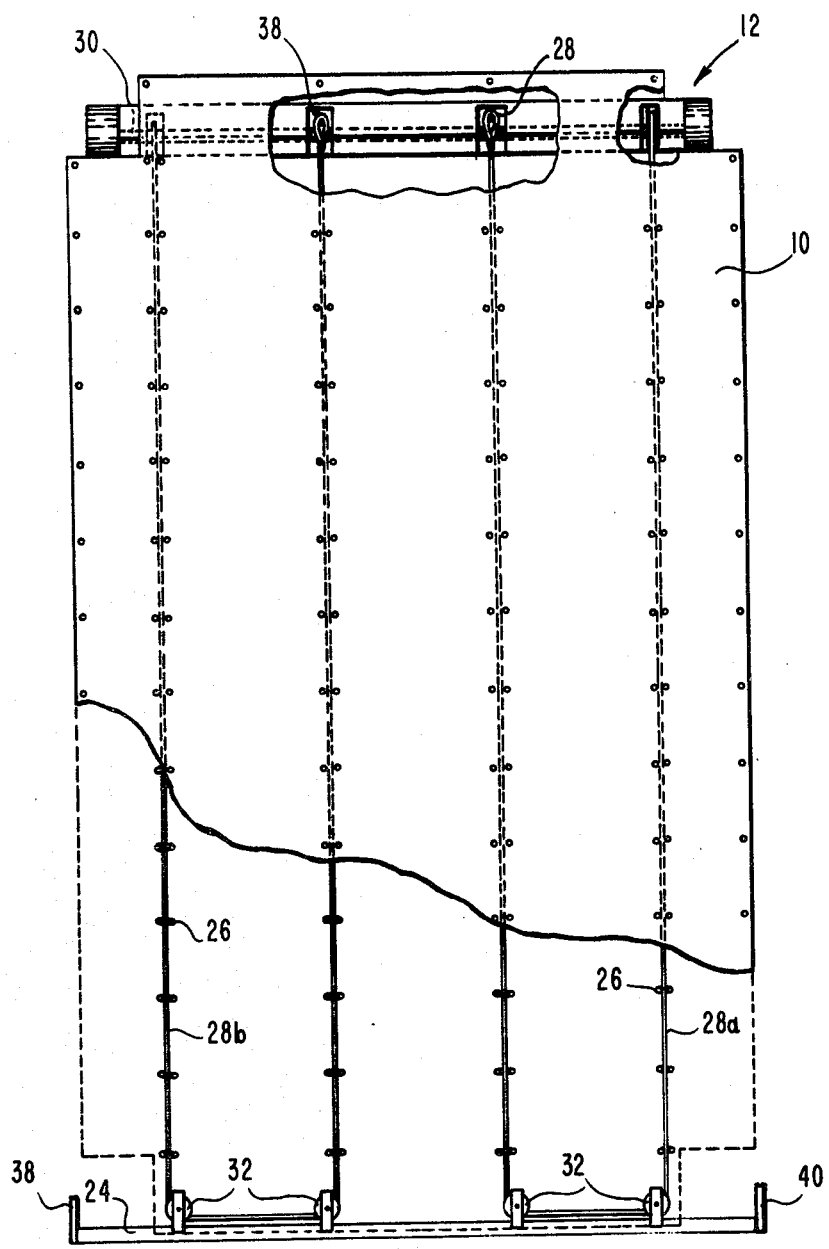
FIG. 5 is a plan view of the novel truck cover.

The novel truck cover is shown installed on a truck body in FIG. 1 and the constructional details of the truck cover are shown in FIGS. 2–5. With reference to FIG. 1, the invention comprises a flexible sheet 10 of canvas or other suitable material affixed at its forward edge to an assembly 12 which is attached to the forward end of the box-type truck body 14 adjacent to the cab 16, and its rearward edge to a frame or bail 18 which is pivotally attached to the truck body or chassis and spring loaded to draw the sheet rearward over the open top of the body. The forward edge of cover sheet 10 is attached in any convenient manner to assembly 12 such as by fasteners 20 secured to housing 22 of assembly 12. The rearward edge of cover sheet 10 is attached to the horizontal member 24 of frame 18 by any suitable means. In its fully rearward position, the cross arm 24 of frame 18 is disposed generally at the upper rear edge of the truck body. The cover 10 is sized to fully close the top of body 14.

As more particularly shown in FIGS. 2–5, the cover 10 has a plurality of rings or grommets 26 disposed along spaced parallel paths extending along the length of the cover. A steel cable 28 or other cord of suitable strength is slidably threaded through the rings 26. The rings typically are D-shaped with the flat side fastened to the cover 10. In the illustrated embodiment a first cable 28a is disposed in a generally U-shaped path with the free ends affixed to a rotatable shaft 30 of assembly 12, and the opposite end of the cable being threaded through rotatable pulleys 32 attached to frame member 24. A second cable 28b is similarly affixed at its ends to the shaft 30 and threaded through rings 26 and pulleys 32 affixed to frame member 24. It will be appreciated that the number of parallel cable paths can very and will depend upon the length and width of the particular cover.

The assembly 12 at the forward end of the truck cover includes a motor drive 29, typically a reversible electric motor, coupled to rotatable shaft 30 which is rotatable within bearings provided at the respective ends of the assembly housing. The assembly 12 includes a horizontal support member 34 which is attached to the forward end of the truck body by verticle support posts 36.

The frame 18 includes horizontal cross member 24 to which the rearward edge of cover 10 is attached, and downwardly extending legs 38 and 40 on respective opposite sides of the truck body. The lower ends of legs 38 and 40 are pivotally attached to respective brackets 42 affixed to body 14 or to the truck chassis. A spring assembly 44 is attached to the pivotally connected end of each leg 38 and 40 and is operative to urge the frame to a full rearward position. The spring assembly 44 is itself of well known form and can be of adjustable tension to suit the particular cover 10.

In operation, the motor 29 can be operated in a forward or reverse direction to furl and unfurl the cover 10 over the open top of the truck body. The motor can be operated by an appropriate switch provided for example in the cab of the truck. During forward rotation of the motor, the shaft 30 is caused to rotate in a forward direction causing the cables 28 to be coiled onto the shaft and causing the cover to be drawn to the forward end of the truck body. The frame assembly 18 remains rearwardly urged by the spring assemblies 44 to maintain tension on cables 28 and cover 10 as it is being furled. The cover can not flap or otherwise become unwieldy during the furling operation by reason of the controlled tension on cables 28. As the cover is being furled, the cables 28 pass through slots 38 provided in the housing of assembly 12, the slots being of a width to prevent passage of rings 26 such that the cover 10 tends to form a series of folds 40 over the housing, as shown in FIGS. 2 and 4.

In order to unfurl cover 10 into its position covering the open top of body 14, the motor 29 is operated in its reverse direction, causing rotation of the shaft in a reverse sense and causing uncoiling of cables 28 wound therearound, the rearward edge of the cover being drawn toward the rear of the truck body by the spring action of frame 18. During unfurling of the cover, the spring loaded frame again maintains tension of the cover such that the cover is smoothly and efficiently drawn rearward into its covered position over the open body. When fully unfurled, the cover sheet is retained throughout its length by the longitudinally extending cables 28 and associated rings 26 to prevent any significant flapping or bulging of the cover.

It will be appreciated that various modifications can be made in implementing the invention without departing from the true scope of the invention. For example, the assembly 12 can include a shaft rotatable by different means, such as a hand crank, than the electric motor drive illustrated. Similarly, the spring loaded frame can assume a variety of forms for securing the rearward edge of the cover sheet. The frame need not necessarily be spring loaded but can be drawn rearward in order to unfurl the cover by a manually applied force on the frame or rearward edge of the cover sheet. Accordingly the invention is not to be limited except as indicated in the appended claims.

What is claimed is:

1. For use with an open top truck body, a truck cover comprising:
   an assembly disposed at the forward end of a truck body and having a rotatable shaft and motive means coupled thereto for rotating the shaft in a forward or a reverse direction;
   a frame having a pair of spaced generally parallel legs, the lower ends of which are pivotally mounted at respective sides of the truck body, and a cross member connecting the upper ends of said legs;
   means for urging said frame into a rearward position with said cross member generally at the rear end of the truck body;
   a cover sheet of flexible material secured at its forward edge to said assembly and at its rearward edge to said cross member of said frame;
   a plurality of cables disposed along spaced parallel paths and secured at one end to said rotatable shaft and at the opposite end to said cross member, the cables being of a length to extend substantially along the full length of the truck body and cover sheet;
   said plurality of cables including first and second cables each disposed in a generally U-shaped path, the free ends affixed to said rotatable shaft and the opposite end being threaded through rotatable pulleys attached to said cross member;
   a plurality of rings attached to said cover sheet in spaced parallel arrays in alignment with said spaced parallel paths, the cable along each parallel path being slidably disposed through the associated array of rings;
   said assembly including a housing having openings therein through which said cables are disposed and of a size and configuration to prevent entry of said rings through said openings;
   said rotatable shaft being operative upon rotation in a forward direction to wind said cables onto the shaft to draw the cover sheet forward into a furled position at said assembly, and operative upon rotation in a reverse direction to unwind said cables from the shaft and permit the cover sheet to unfurl into its open position by the action of said frame.

2. For use with an open top truck body, a truck cover comprising:
   an assembly disposed at the forward end of a truck body and having a rotatable shaft and motive means coupled thereto for rotating the shaft in a forward or a reverse direction;
   a frame having a pair of spaced generally parallel legs, the lower ends of which are pivotally mounted at respective sides of the truck body, and a cross member connecting the upper ends of said legs;
   means for urging said frame into a rearward position with said cross member generally at the rear end of the truck body;
   a cover sheet of flexible material secured at its forward edge to said assembly and at its rearward edge to said cross member of said frame;
   a plurality of cables disposed along spaced parallel paths and secured at one end to said rotatable shaft and at the opposite end to said cross member, the cables being of a length to extend substantially along the full length of the truck body and cover sheet;
   a plurality of rings attached to said cover sheet in spaced parallel arrays in alignment with said space parallel paths, the cable along each parallel path being slidably disposed through the associated array of rings;
   said assembly including a housing having elongated slots therein through which said cables are disposed, said slots having a width less than the diameter of said rings to prevent entry of said rings through said slots;
   said rotatable shaft being operative upon rotation in a forward direction to wind said cables onto the shaft to draw the cover sheet forward into a furled position at said assembly, and operative upon rotation in a reverse direction to unwind said cables from the shaft and permit the cover sheet to unfurl into its open position by the action of said frame.

3. The truck cover of claim 2 wherein the motive means of said assembly includes a reversible electric motor coupled to said rotatable shaft for providing forward or reverse shaft rotation.

4. The truck cover of claim 2 wherein said means includes first and second spring assemblies each coupled to a respective one of said legs at the pivotally mounted end and operative to urge said frame to said rearward position.

5. The truck cover of claim 2 wherein said cover sheet in its furled position is disposed in a series of folds over said assembly.

6. The truck cover of claim 2 wherein said cables and rings are disposed below said cover sheet.

* * * * *